(12) United States Patent
Shehane et al.

(10) Patent No.: US 6,900,803 B2
(45) Date of Patent: May 31, 2005

(54) METHOD FOR RASTERIZING GRAPHICS FOR OPTIMAL TILING PERFORMANCE

(75) Inventors: Patrick Shehane, Fremont, CA (US); Michael G. Lavelle, Saratoga, CA (US); Mark E. Pascual, San Jose, CA (US); Wing-Cheong Tang, Union City, CA (US); Nandini Ramani, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 42 days.

(21) Appl. No.: 10/096,346

(22) Filed: Mar. 12, 2002

(65) Prior Publication Data

US 2003/0174130 A1 Sep. 18, 2003

(51) Int. Cl.[7] ............................................... G06T 17/20
(52) U.S. Cl. ...................... 345/423; 345/421; 345/441; 345/581; 345/582; 345/506
(58) Field of Search ................................. 345/421, 426, 345/441, 613, 582, 423, 506, 581, 419, 422

(56) References Cited

U.S. PATENT DOCUMENTS 6,016,151 A * 1/2000 Lin .............................. 345/582
6,094,201 A * 7/2000 Malamy et al. .............. 345/441

* cited by examiner

*Primary Examiner*—Kimbinh T. Nguyen
(74) *Attorney, Agent, or Firm*—Meyertons Hood Kivlin Kowert & Goetzel, P.C.; Jeffrey C. Hood

(57) ABSTRACT

A graphics system and method are disclosed that may optimize the rate of pixel generation to match the rate at which a memory may be designed to receive pixel data. If a memory is configured to store multiple pixels substantially simultaneously, it may be advantageous to render an equivalent number of pixels substantially simultaneously and at the same rate. An edge walker that utilizes multiple sets of accumulators to generate multiple scan lines substantially simultaneously and a span walker that utilizes multiple sets of accumulators to render multiple pixel values substantially simultaneously is described.

17 Claims, 12 Drawing Sheets

METHOD FOR RASTERIZING GRAPHICS FOR OPTIMAL TILING PERFORMANCE

BACKGROUND OF THE INVENTION

1. Field of the Invention

This invention relates generally to the field of computer graphics and, more particularly, to high performance computer graphics systems.

2. Description of the Related Art

Early graphics systems were limited to two-dimensional (2D) graphics, were configured to compute a gray scale value for each pixel displayed, and acted as simple translators or interfaces to a display device. Modem high performance graphics systems, however, may support three-dimensional (3D) graphics with one or more special effects such as anti-aliasing, texturing, shading, fogging, alpha-blending, and specular highlighting. 3D graphics data may be several orders of magnitude larger than comparable 2D graphics data. 3D graphics data may include a set of information components for each vertex of the geometric primitives used to model the objects to be imaged.

In recent years, demand for high performance graphics systems that can render complex three-dimensional (3D) objects and scenes have increased substantially. This increase is at least in part due to the demand for new applications such as computer-generated animation for motion pictures, virtual reality simulators/trainers, and interactive computer games. These new applications place tremendous computational loads upon graphics systems. Modem computer displays have also improved and have a significantly higher pixel resolution, greater color depth, and are able to display more complex images with higher refresh rates than earlier models. Consequently, modem high performance graphics systems incorporate graphics processors with a great deal of complexity and power, and the color value of one pixel may be the accumulated result of many calculations involving several models and mathematical approximations.

With each new generation of graphics system, there is more image data to process, the processing is more complex, and there is less time in which to process it. This need for more processing power is being met with the combination of more hardware resources and/or more efficient processes.

SUMMARY OF THE INVENTION

The problems set forth above may at least in part be solved in some embodiments by a graphics system and method that may optimize the rate of pixel generation to match the rate at which the memory architecture is designed to receive pixel data. If a memory is configured to store multiple pixels substantially simultaneously it may be advantageous to render an equivalent number of pixels substantially simultaneously and at the same rate. An edge walker and a span walker architecture described herein, that utilizes multiple sets of accumulators to generate multiple scan lines and render multiple pixel values substantially simultaneously, may achieve this goal.

The edge walker may have 2 sets of accumulators to generate parameter values for two sets of end points for two scan lines substantially simultaneously. The span walker may use four sets of accumulators to determine parameter values for a first and a second pixel on each of the 2 scan lines substantially simultaneously. This configuration may enable the edge walker and the span walker to generate parameter values for four pixels substantially simultaneously. In other embodiments, additional accumulators may be utilized to enable more than 2 scan lines to be processed substantially simultaneously.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
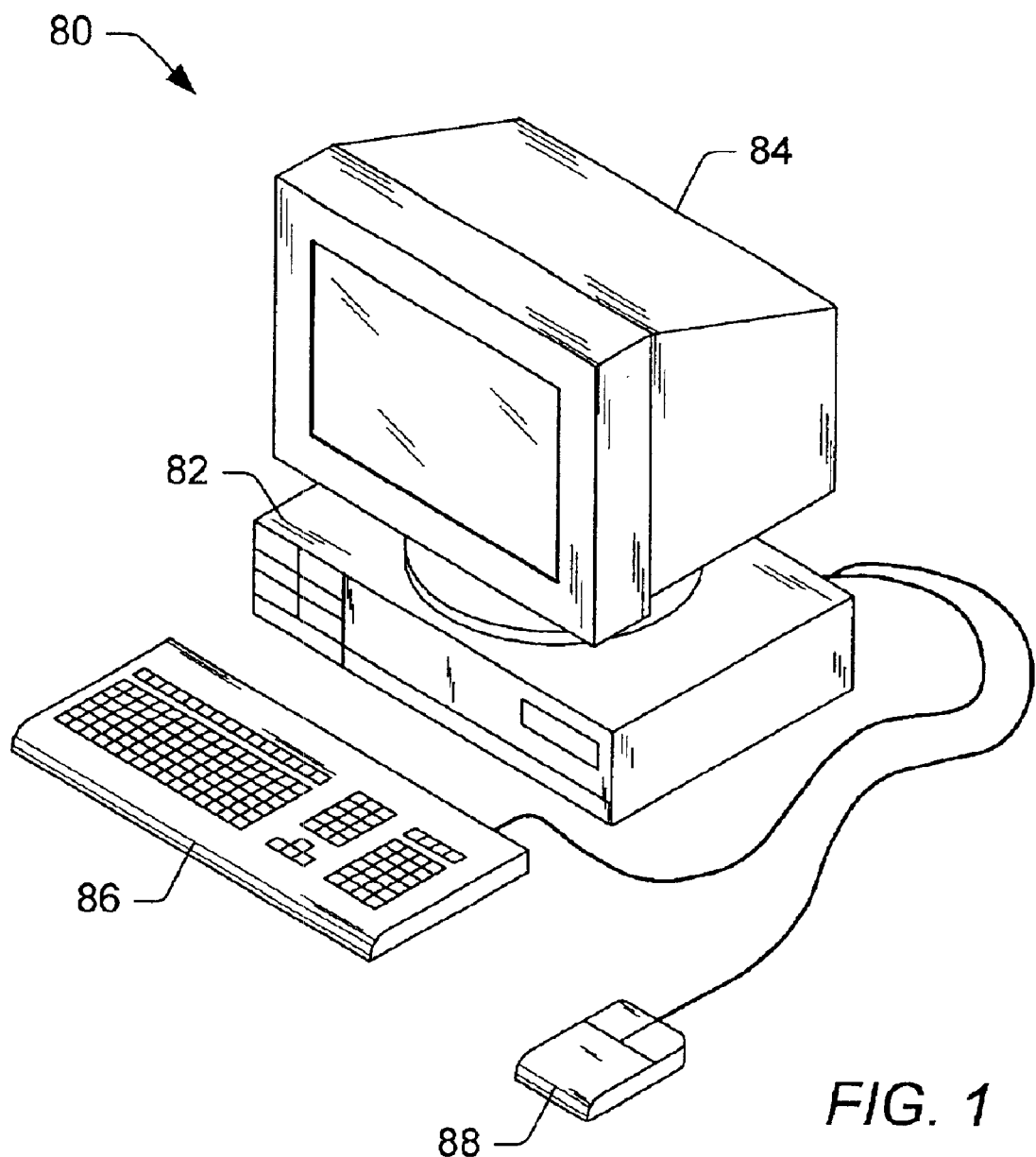
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
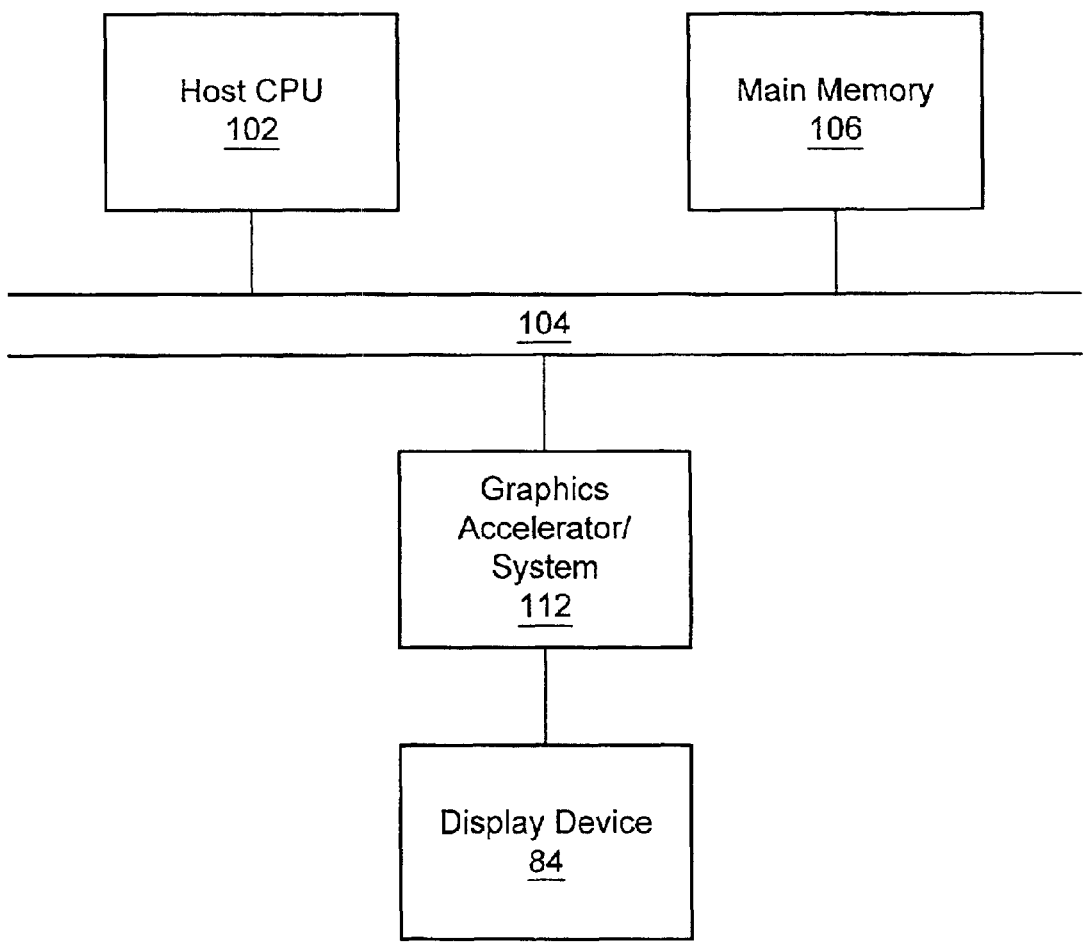
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
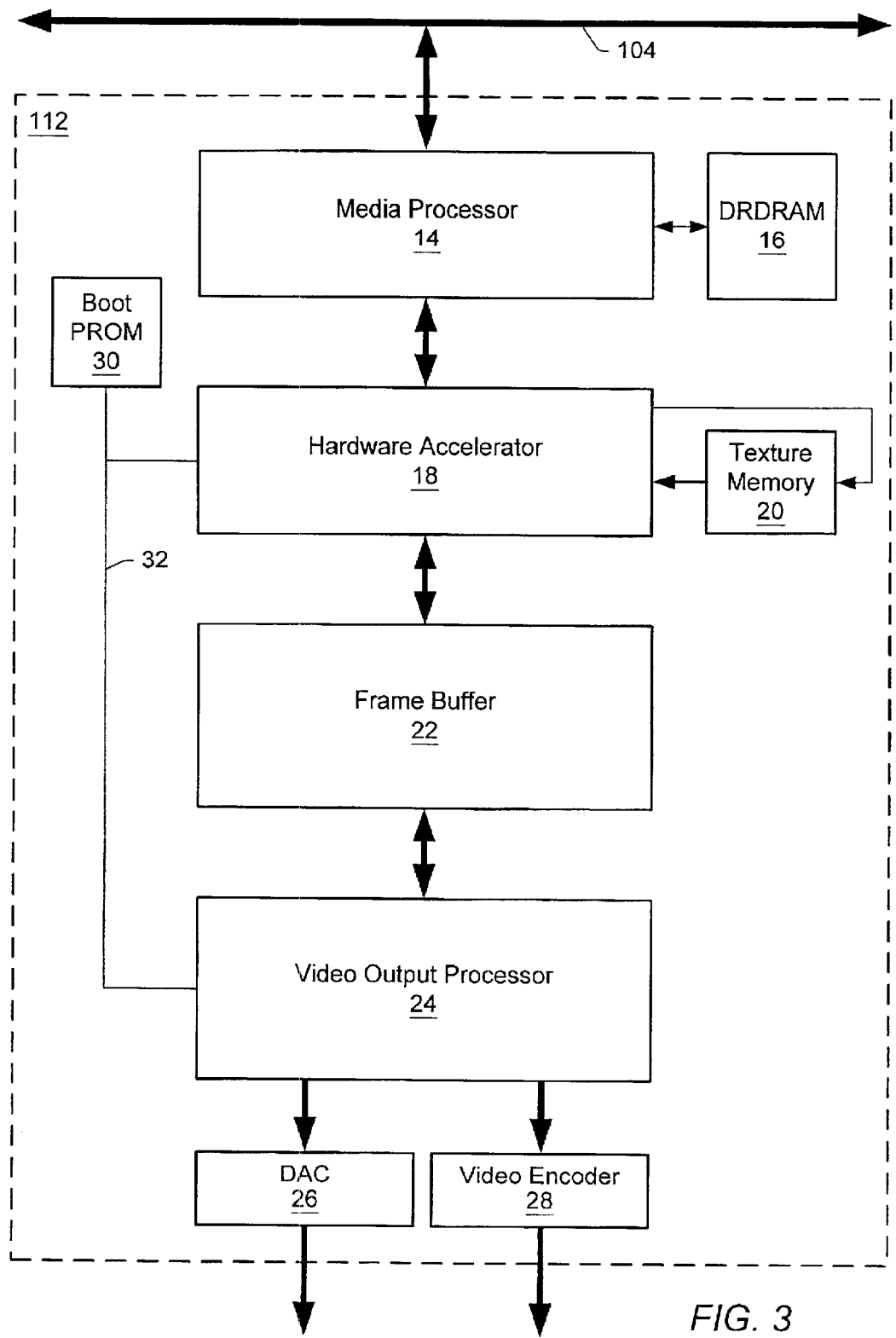
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
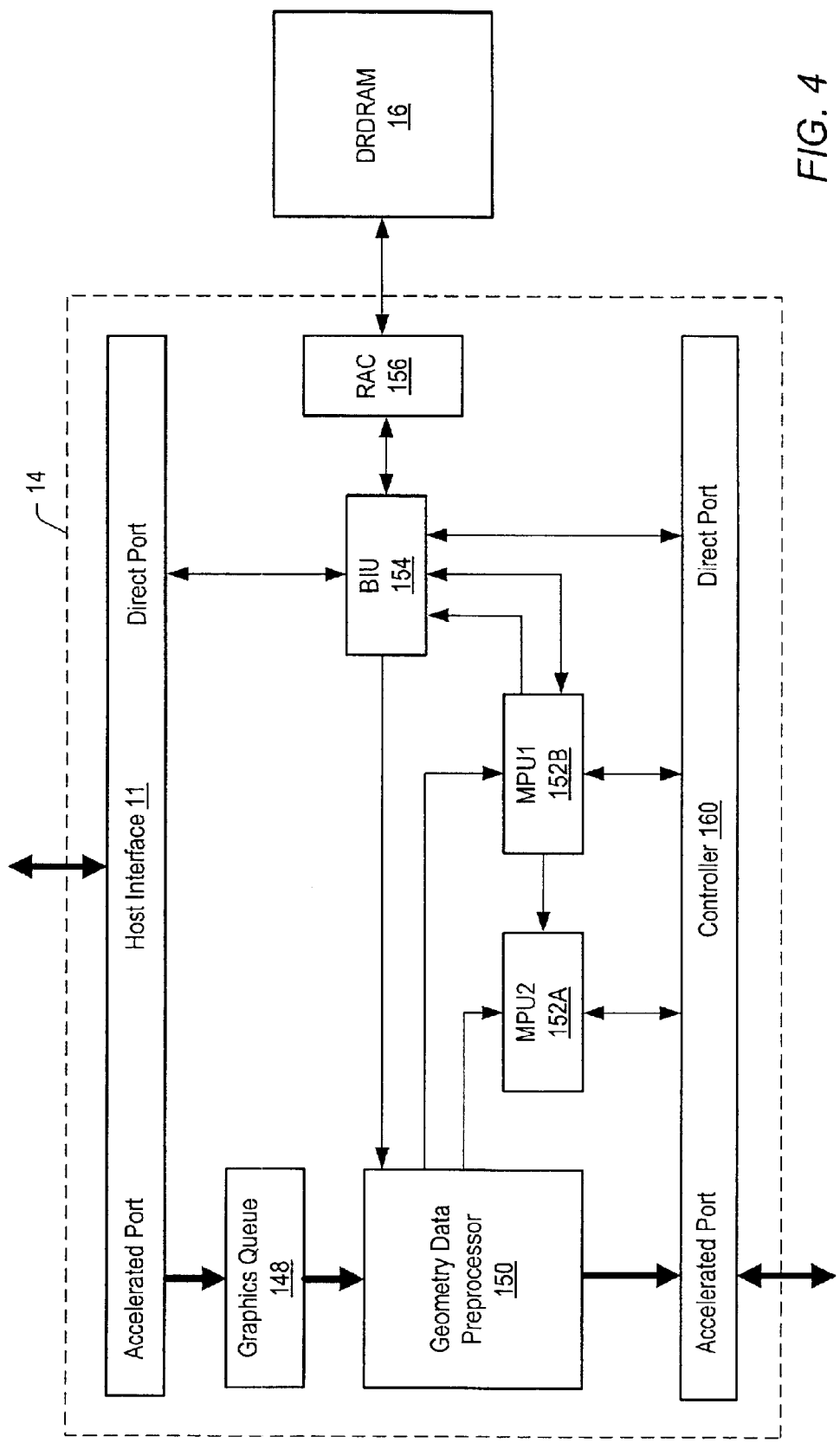
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappings (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
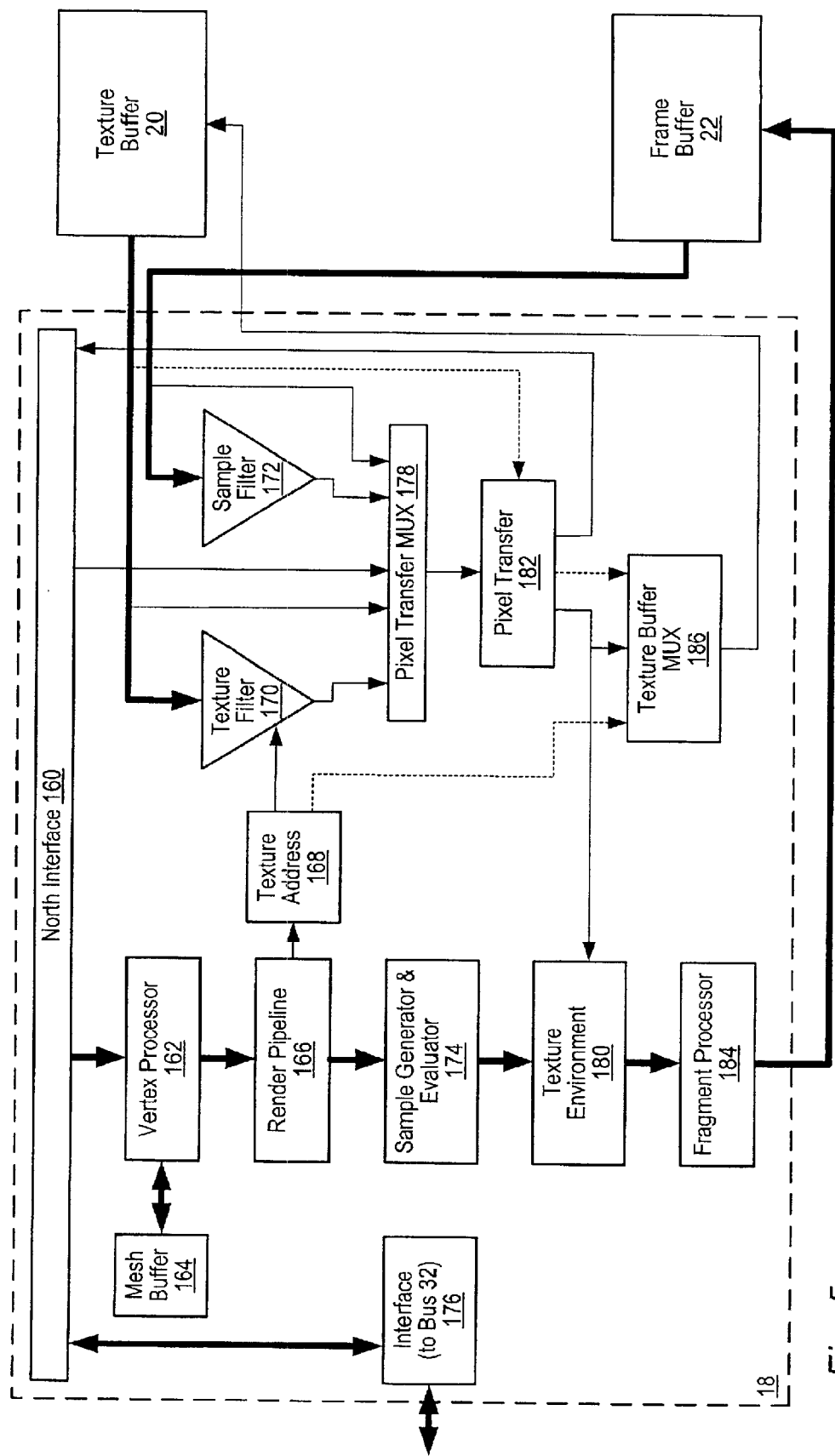
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);
r2, g2, b2 (i.e., red, green, and blue specular color from lit textures);
alpha (i.e. transparency);
z (i.e. depth); and
s, t, r, and w (i.e. texture components).

In embodiments using super-sampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22.

The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
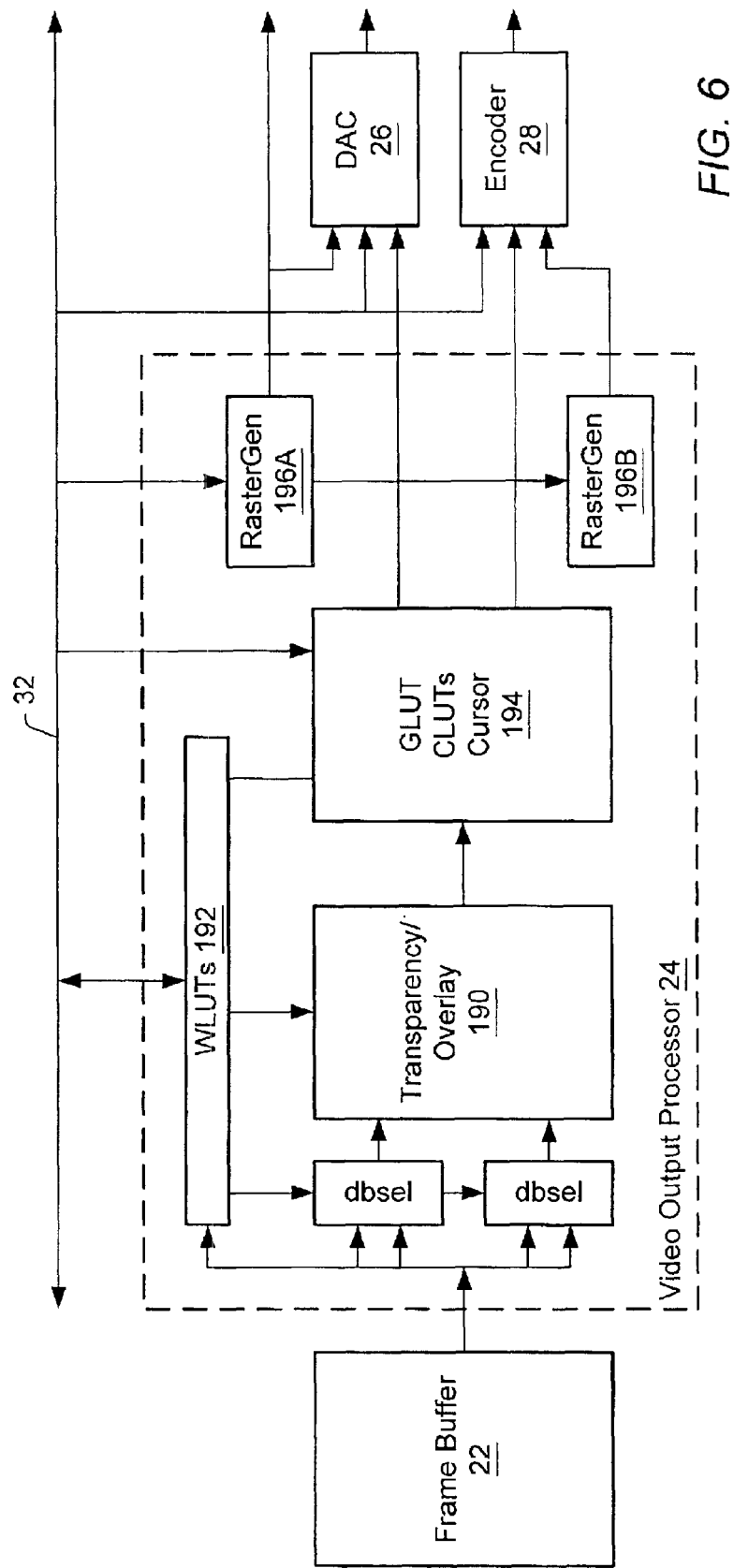
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
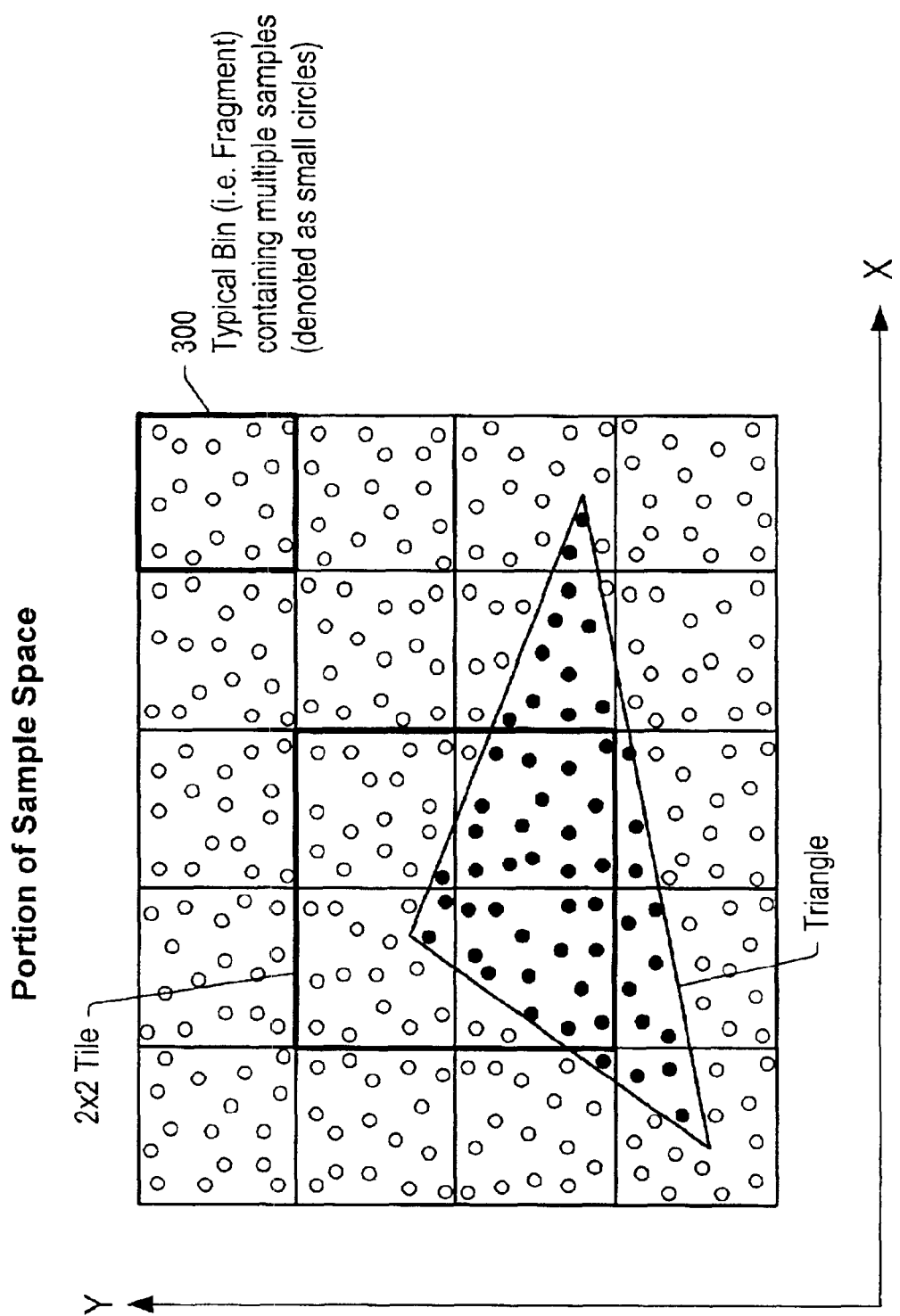
FIG. 7 is an illustration of a sample space partitioned into an array of bins.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins as illustrated in FIG. 7. Each bin may contain one or more samples. The number of samples per bin may be a programmable parameter.

Figure 8:
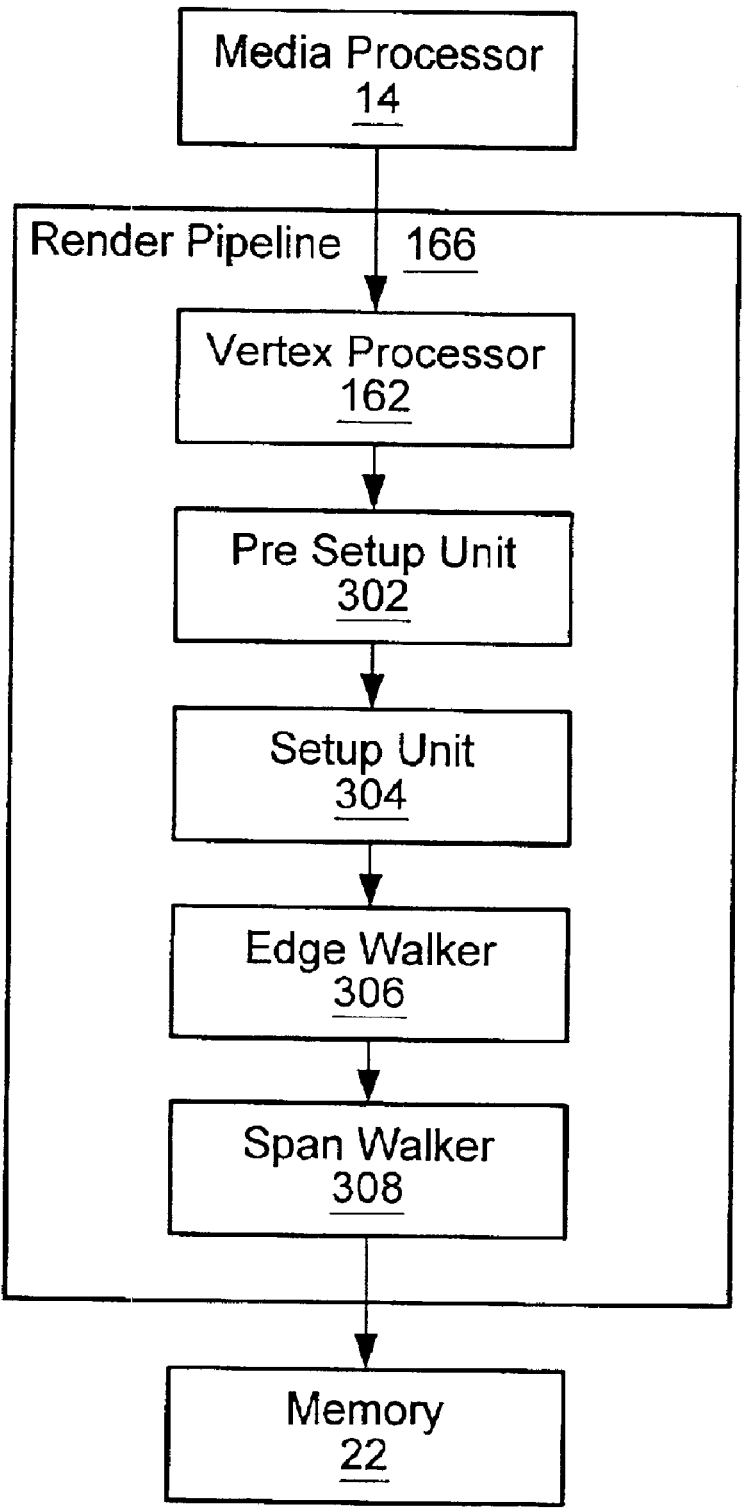
FIG. 8 is a more detailed block diagram of a portion of the render pipeline of FIG. 5.

Render Pipeline—FIG. 8

FIG. 8 illustrates a more detailed block diagram of one embodiment of the render system or render pipeline 166. As shown, the render pipeline 166 may comprise a Vertex Processor (VP) 162, a Pre-Setup Unit (PSU) 302, a Setup Unit (SU) 304, an Edge Walker (EW) 306, and Span Walkers (SW) 308.

The Vertex Processor 162 operates to assemble triangles (or polygons) from the vertex information received from the media processor 14. The Pre-Setup Unit 302 operates to pre-process the triangle data. The Setup Unit 304 defines the edges of the triangle and the variation of parameter values (x,y,z,r,g,b . . . ) across the triangle. The Edge Walker 306 operates to define start and end points of scan lines that span the triangle from a controlling edge (longest or major edge) to a subordinate edge of the triangle. The scan lines are stepped in the major direction by steps of 1. The Span Walker 308 operates to interpolate pixel values along the scan lines. For each span line issued by the EW 306, the SW 308 interpolates parameter values for each pixel location that lies on the scan line between the controlling edge point and the subordinate edge point on the scan line.

Figure 9:
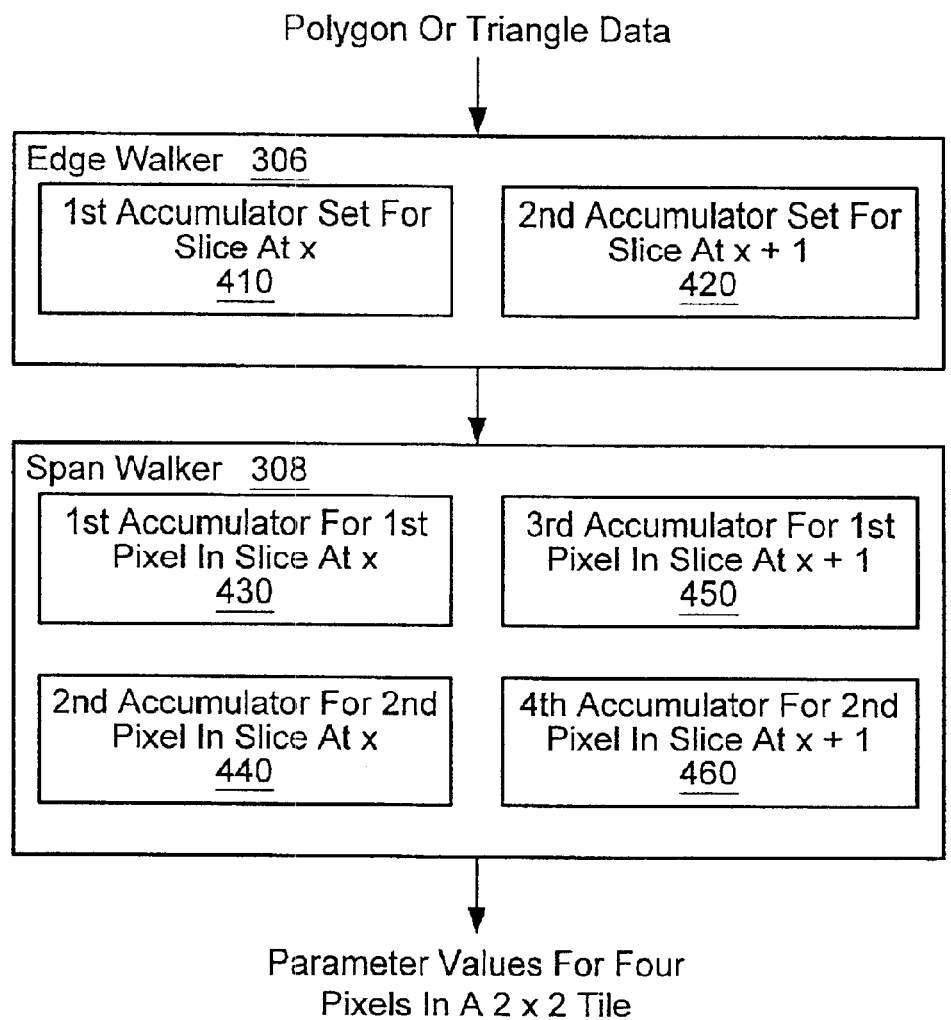
FIG. 9 is a block diagram of the internal structure of the edge walker and span walker of FIG. 8.
Figure 9A:
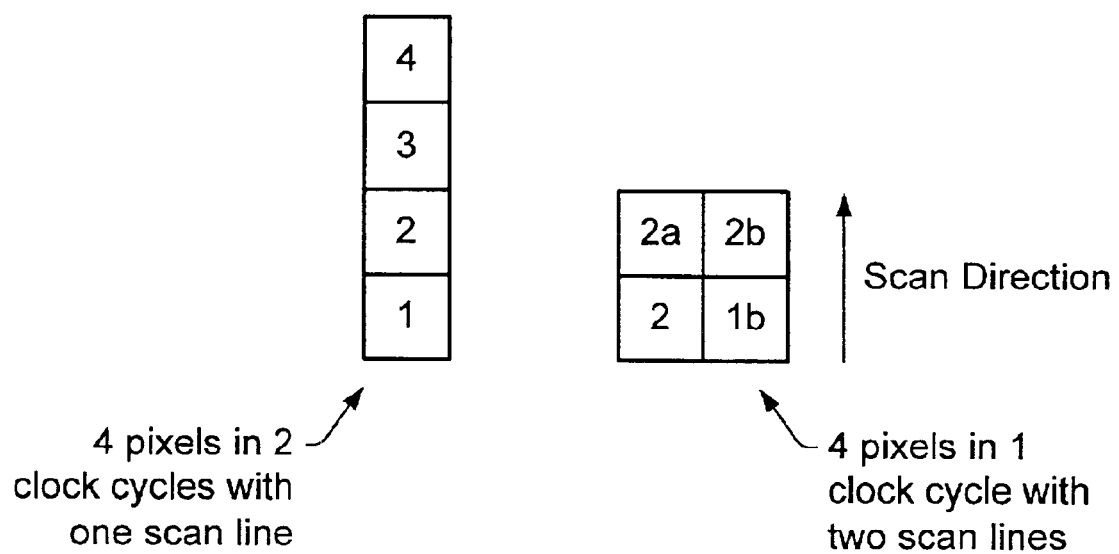
Figure 9B:
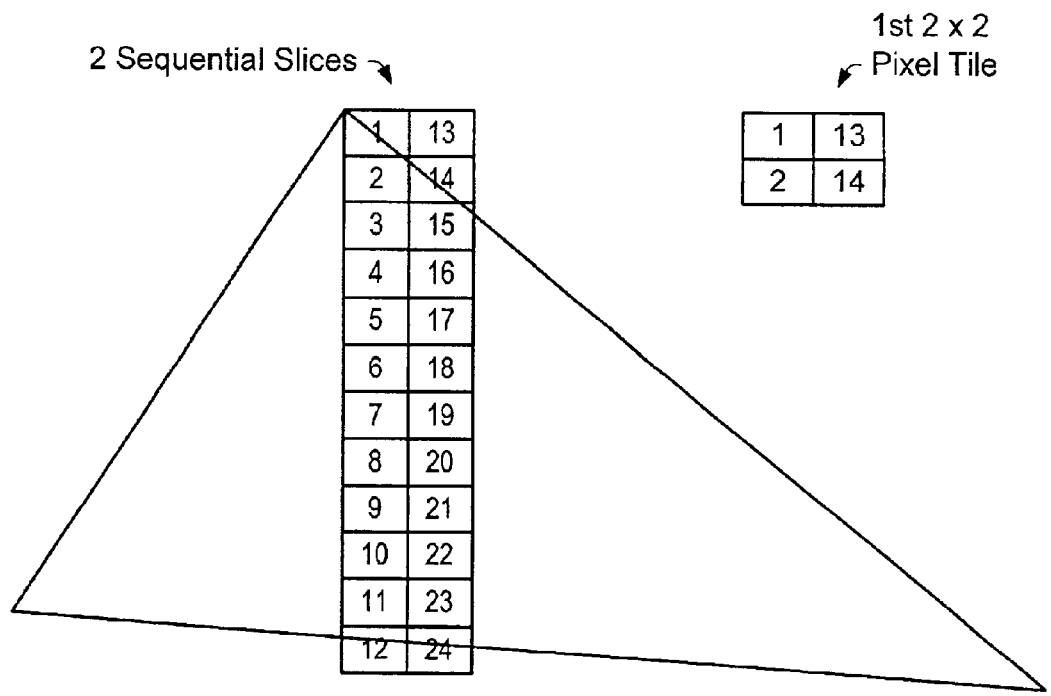
Figure 9C:
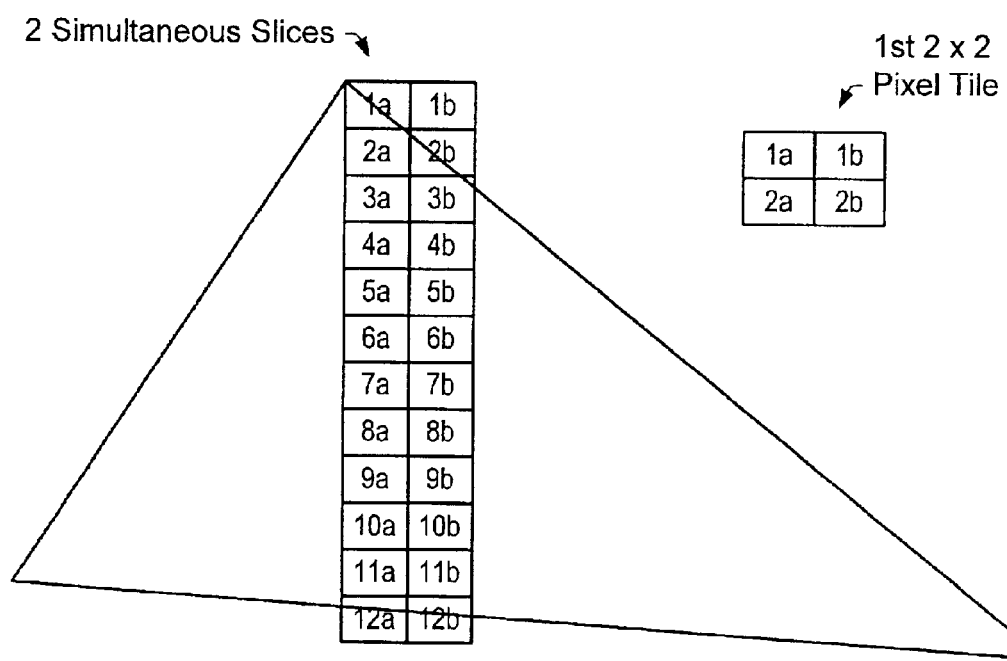

Internal Structure of Edge Walker and Span Walker—FIG. 9

FIG. 9 illustrates one embodiment of the EW 306 and the SW 308. The EW 306 may have 2 sets of accumulators 410–420 to generate parameter values for two sets of end points for two scan lines substantially simultaneously. The SW 308 may use four sets of accumulators 430–460 to determine parameter values for a first and a second pixel on each of the 2 scan lines substantially simultaneously. This configuration may enable the EW 306 and the SW 308 to generate parameter values for four pixels substantially simultaneously. In other embodiments, additional accumulators may be utilized to enable more than 2 scan lines to be processed substantially simultaneously.

Figure 10:
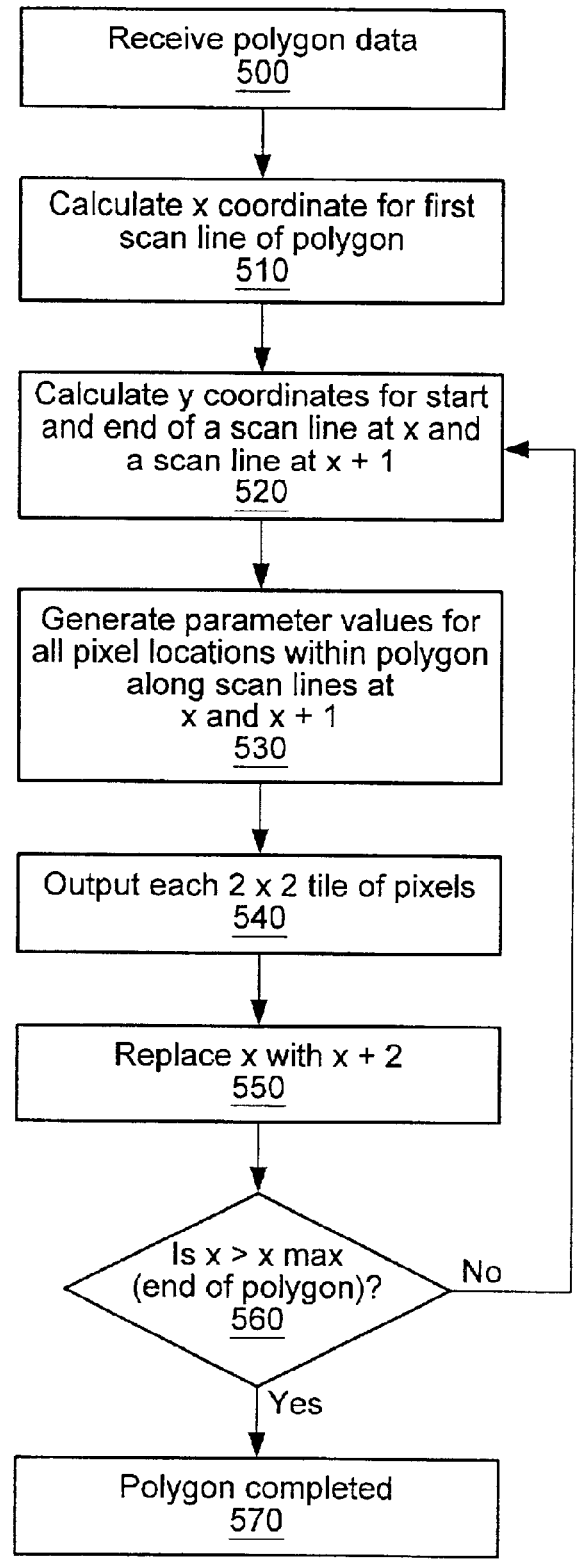
FIG. 10 is a flowchart for a method for rendering multiple pixels substantially simultaneously.

Method for Rendering Multiple Pixels Substantially Simultaneously—FIG. 10

FIG. 10 provides a flowchart for one embodiment of a method for rendering a triangle (or polygon) in a graphics system. The method includes receiving information regarding the triangle that includes data for the controlling edge (major edge or longest edge) and the two subordinate edges of the triangle and the variation of parameter values (x,y,z, r,g,b . . . ) across the triangle (step 500). The Edge Walker 306 determines the x coordinate for a first scan line (also referred to herein as a span or slice) (step 510) and then substantially simultaneously calculates the y coordinates for the start and end points for the two scan lines at x and x+1 (step 520). The Span Walker 308 substantially simultaneously interpolates parameter values for 4 pixel locations at a time, 2 on the first scan line at x and 2 on the second scan line at x+1 (step 530) and outputs each 2×2 tile of pixels (step 540). The Edge Walker 306 replaces x with x+2 and tests to determine if the new x coordinate is greater than x max, the x coordinate for the end of the triangle (step 560). If x is greater than x max, the triangle is fully rendered (step 570). If x is not greater than x max, the Edge Walker 306 calculates y coordinates for the start and end points for two new scan lines at the new x and x+1 coordinates (step 520) and steps 530–560 are repeated. In some embodiments, the 4 pixels of the 2×2 tile of pixels may be written substantially simultaneously to a memory 22.

In other embodiments, Edge Walker 306 may be configured to process substantially simultaneously 3 or more scan lines, Span Walker 308 may be configured to process substantially simultaneously 2×2 or larger pixel arrays, and a memory 22 may be configured to substantially simultaneously receive 4 or more pixels.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for rendering a plurality of triangles in a graphics system, wherein, for each of the triangles, the method comprises:

receiving information regarding the triangle and specifying a major edge of the triangle;

performing edge walking along the major edge of the triangle, wherein said edge walking generates a plurality of pairs of points, wherein each pair of points defines a start and an end of a scan line that traverses the triangle, and wherein said performing edge walking generates a plurality of scan lines substantially simultaneously;

performing span walking along the plurality of scan lines, wherein said span walking determines parameter values for each pixel location that lies on one of the scan lines and is within the triangle, wherein said span walking is performed after said edge walking, wherein said span walking operates on a plurality of scan lines substantially simultaneously.

2. The method of claim 1, wherein said performing edge walking generates 2 scan lines substantially simultaneously;

wherein said span walking operates on 2 scan lines substantially simultaneously.

3. The method of claim 2, wherein said span walking generates 2×2 pixel tiles from the 2 scan lines.

4. The method of claim 1, further comprising writing a plurality of pixels substantially simultaneously to a memory, wherein said writing is performed in response to pixels generated by said edge walking and said span walking.

5. The method of claim 1, wherein said performing edge walking and said performing span walking are performed in a pipelined fashion.

6. The method of claim 1, wherein said performing edge walking and said performing span walking are repeated until a next plurality of scan lines would begin outside the triangle.

7. A method for rendering a plurality of triangles in a graphics system, wherein, for each of the triangles, the method comprises:

receiving information regarding the triangle and specifying a major edge of the triangle;

operating along the major edge of the triangle to generate start and end points, wherein the start and end points define respective spans of the triangle, wherein said operating generates a plurality of spans substantially simultaneously;

determining parameter values at pixel locations in the spans of the triangle, wherein said determining is performed after said operating, wherein said determining operates on a plurality of spans substantially simultaneously.

8. A method for rendering a plurality of triangles in a graphics system, wherein, for each of the triangles, the method comprises:

receiving information regarding the triangle and specifying a major edge of the triangle;

performing edge walking along the major edge of the triangle to generate 2 pairs of start and end points, wherein the 2 pairs of start and end points define respective spans of the triangle;

performing span walking to determine parameter values at pixel locations in the 2 spans of the triangle based on the start and end points, wherein said span walking is performed alter said edge walking, wherein said span walking operates on the 2 spans substantially simultaneously, and wherein said span walking generates parameter values for 4 pixels substantially simultaneously; and storing each group of 4 pixels in a memory substantially simultaneously.

9. A graphics system, comprising:

an edge walker unit that receives information regarding a triangle and performs edge walking on a major edge of the triangle to generate start and end points, wherein the start and end points define respective scan lines across the triangle, wherein the edge walker unit generates a plurality of scan lines substantially simultaneously; and a span walker unit, coupled to the edge walker unit, that determines parameter values at pixel locations on the scan lines, wherein said span walker unit operates after said edge walker unit, wherein said span walker unit operates on a plurality of scan lines substantially simultaneously.

10. The system of claim 9, wherein the edge walker unit includes a first plurality of accumulators;

wherein the first plurality of accumulators operate substantially simultaneously to generate the plurality of scan lines;

wherein the span walker unit includes a second plurality of accumulators;

wherein the second plurality of accumulators operate on the plurality of scan lines substantially simultaneously.

11. The system of claim 9, further comprising a memory, wherein the memory is configured to store the parameter values determined for each pixel within the triangle.

12. The system of claim 9, further comprising one or more of a host processor, input devices, memories, and display devices connected to the graphics system.

13. A system for rendering a plurality of triangles, the system comprising:

a means for receiving information regarding the triangle and specifying a major edge of the triangle;

a means for performing edge walking along the major edge of the triangle, wherein said edge walking means is configured to generate a plurality of pairs of points, wherein each pair of points defines a start and an end of a scan line that traverses the triangle, and wherein said edge walking means is further configured to generate a plurality of scan lines substantially simultaneously;

a means for performing span walking along the plurality of scan lines, wherein said span walking means is configured to determine parameter values for each pixel location that lies on one of the scan lines and is within the triangle, wherein said span walking means occurs after said edge walking means in a computational pipeline, wherein said span walking means is further configured to operate on a plurality of scan lines substantially simultaneously.

14. The system of claim 13, wherein said edge walking means is configured to generate 2 scan lines substantially simultaneously;

wherein said span walking means is configured to operate on 2 scan lines substantially simultaneously.

15. The system of claim 14, wherein said span walking means is configured to generate 2×2 pixel tiles from the 2 scan lines.

16. The system of claim 13, further comprising a means for writing a plurality of pixels from the plurality of scan lines substantially simultaneously to a memory, wherein said writing means performs said writing in response to the generation of pixels by said span walking means.

17. The system of claim 13, wherein said edge walking means is configured to repeat said generating of a plurality of pairs of points until a next plurality of scan lines would begin outside the triangle.

* * * * *